United States Patent
Drüke

(10) Patent No.: US 11,745,433 B2
(45) Date of Patent: Sep. 5, 2023

(54) CONNECTION ELEMENT FOR ADHERING TO A COMPONENT SURFACE AND PRODUCTION METHOD AND SECURING METHOD THEREFOR

(71) Applicant: Böllhoff Verbindungstechnik GmbH, Bielefeld (DE)

(72) Inventor: Franz Drüke, Detmold (DE)

(73) Assignee: Böllhoff Verbindungstechnik GmbH, Bielefeld (DE)

(*) Notice: Subject to any disclaimer, the term of this patent is extended or adjusted under 35 U.S.C. 154(b) by 90 days.

(21) Appl. No.: 17/254,751

(22) PCT Filed: May 29, 2019

(86) PCT No.: PCT/EP2019/063996
§ 371 (c)(1),
(2) Date: Dec. 21, 2020

(87) PCT Pub. No.: WO2020/007540
PCT Pub. Date: Jan. 9, 2020

(65) Prior Publication Data
US 2021/0268747 A1    Sep. 2, 2021

(30) Foreign Application Priority Data

Jul. 5, 2018 (DE) .................. 102018116350.9

(51) Int. Cl.
*B29C 65/14* (2006.01)
*B29C 65/48* (2006.01)
*B29C 65/00* (2006.01)

(52) U.S. Cl.
CPC ...... *B29C 65/1435* (2013.01); *B29C 65/4845* (2013.01); *B29C 66/474* (2013.01); *B29C 66/7392* (2013.01); *B29C 66/73365* (2013.01)

(58) Field of Classification Search
CPC ........... B29C 65/1435; B29C 65/4845; B29C 66/474; B29C 66/73365; B29C 66/7392;
(Continued)

(56) References Cited

U.S. PATENT DOCUMENTS 7,815,988 B2    10/2010    Stumpf et al.
8,431,054 B2    4/2013    Pervan et al.
(Continued)

FOREIGN PATENT DOCUMENTS

CN    1822943 A    8/2006
CN    104002357 A    8/2014
(Continued)

OTHER PUBLICATIONS

Celanese, Fortran® PPS Polyphenylene Sulfide Short-Term Properties Guide, Sep. 2016. (Year: 2016).*
(Continued)

*Primary Examiner* — Christopher W Raimund
(74) *Attorney, Agent, or Firm* — Reising Ethington P.C.; Matthew J. Schmidt

(57) ABSTRACT

A connection element for adhering to a component surface of a first component, such that a second component can be secured to the first component by the connection element, including a base element having an adhesive side with an adhesive surface, and a mounting structure. The base element consists of a thermoplastic with a temperature of continued use of at least 130° C., which can be poorly irradiated or cannot be irradiated with light, and has at least one irradiation region. The base element can be irradiated with light in this region in such a way that light energy penetrates the base element. The irradiation region, in cross-section, has a smaller thickness and a transmittance at least
(Continued)

Figure 1:
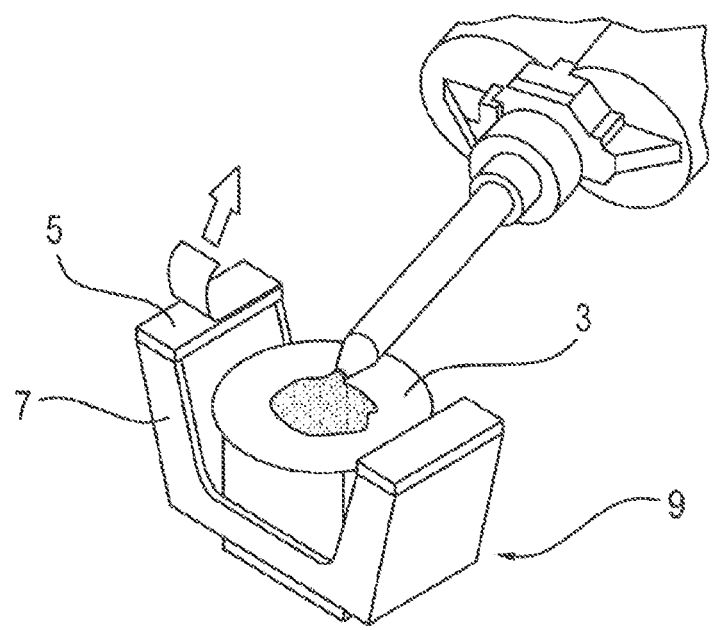

20% with a light wavelength between 320 and 500 nm. Alternatively, the irradiation region is formed by a through-opening.

9 Claims, 5 Drawing Sheets

(58) Field of Classification Search
CPC .............. B29C 65/524; B29C 65/7844; B29C 66/1122; B29L 2031/3085
See application file for complete search history.

(56) References Cited

U.S. PATENT DOCUMENTS

| | | | |
|---|---|---|---|
| 8,663,417 | B2 | 3/2014 | Braun |
| 9,175,707 | B2 | 11/2015 | Drüke |
| 9,387,656 | B2 | 7/2016 | Wulff |
| 9,890,305 | B2 | 2/2018 | Suwa et al. |
| 10,400,806 | B2 | 9/2019 | Drüke |
| 2002/0134489 | A1 | 9/2002 | Sweeney, Jr. et al. |
| 2004/0011457 | A1 | 1/2004 | Kobayashi et al. |
| 2006/0219354 | A1 | 10/2006 | Dehennau et al. |
| 2008/0226238 | A1* | 9/2008 | Sumi .................... G02B 6/4204 385/88 |
| 2010/0316845 | A1 | 12/2010 | Rule et al. |
| 2012/0261066 | A1 | 10/2012 | Smith et al. |
| 2013/0119191 | A1 | 5/2013 | Wolfe et al. |
| 2014/0036353 | A1 | 2/2014 | Krogdahl |
| 2015/0258729 | A1 | 9/2015 | Wolfe et al. |

FOREIGN PATENT DOCUMENTS

| | | | | |
|---|---|---|---|---|
| CN | 104302463 | A | 1/2015 | |
| CN | 104488121 | A | 4/2015 | |
| CN | 105164187 | A | 12/2015 | |
| DE | 102006012411 | A1 | 4/2007 | |
| DE | 102009031188 | A1 | 12/2010 | |
| FR | 2947784 | A1 * | 1/2011 | ............. G03B 17/00 |
| WO | WO2012107240 | A1 | 8/2012 | |

OTHER PUBLICATIONS

XCentric Mold & Engineering, "Part Design: Best Practices for Plastic Injection Molding", Jun. 7, 2018, https://www.xcentricmold.com/plastic-injection-molding-best-practices/. (Year: 2018).*
Transmission Licht, https://www.wikilpolymerservice-merseburg.de/index.php?title=Transmission_Licht&oldid=6632&printable=yes, dated Aug. 15, 2017, 2 pages.
Written Opinion & International Search Report for PCT/EP2019/063996 dated Sep. 16, 2019, 11 pages.
CN Office Action for CN Application No. 201980044686.5 dated Mar. 1, 2022 (12 pages).
International Standard, IEC 60216-1; Electrical Insulating Materials—Thermal Endurance Properties—Part 1: Ageing Procedures and Evaluation of Test Results; Edition 6, dated Mar. 2013; 70 pages; Geneva, Switzerland.
International Standard, IEC 60216-8; Electrical Insulating Materials—Thermal Endurance Properties—Part 8: Instructions for Calculating Thermal Endurance Characteristics Using Simplified Procedures; Edition 1, dated Mar. 2013; 42 pages; Geneva, Switzerland.
English translation of the International Preliminary Report on Patentability for PCT/EP2019/063996 dated Jan. 5, 2021, 8 pages.
CN Notice of Allowance for CN Application No. 201980044686.5 dated Dec. 5, 2022 (7 pages).

* cited by examiner

State of the art

State of the art

State of the art

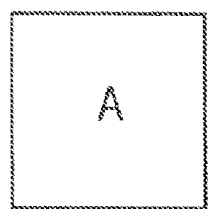
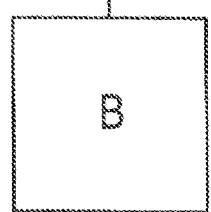
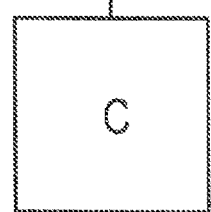
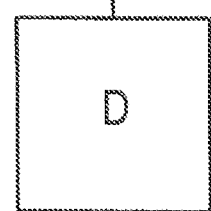
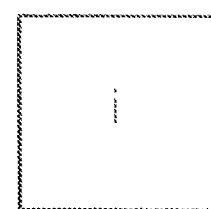
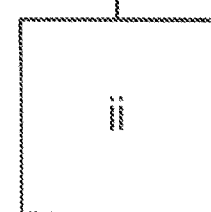
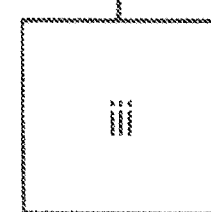
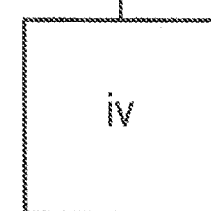
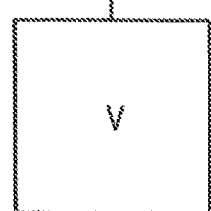
FIG. 8            FIG. 9

CONNECTION ELEMENT FOR ADHERING TO A COMPONENT SURFACE AND PRODUCTION METHOD AND SECURING METHOD THEREFOR

1. TECHNICAL FIELD

The present disclosure is related to a connection element for adhering to a component surface, a first component with a connection element adhered thereon, an arrangement consisting of a first and a second component which are connected via a connection element, a manufacturing method for the connection element as well as a fastening method.

2. BACKGROUND

In the state of the art, connection elements for fastening an add-on part to a structural component are described for the most various applications in the boat building, transporting as well as in aerospace, with the connection elements being processed by means of self-adhesive bridges. Here, connection elements are used which comprise an assembly structure such as for example an inner or outer thread. With respect to the adhesive surface, angled assembly structures are also known which comprise, for example, a nut or a distance holder.

The fastening usually takes place by means of a common two-component adhesive which is applied onto an adhesive surface of the connection element. For this purpose, the connection element together with the adhesive are located in an adhesive bridge which is adhered to the component surface of the structural component by means of a double-sided tap. The connection element is held on the component surface of the structural component by means of this adhesive bridge until the two-component adhesive has cured.

Figure 2:
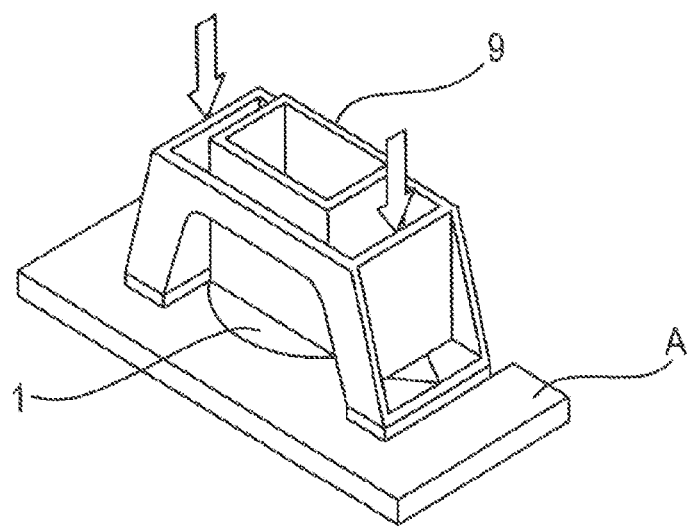
Figure 3:
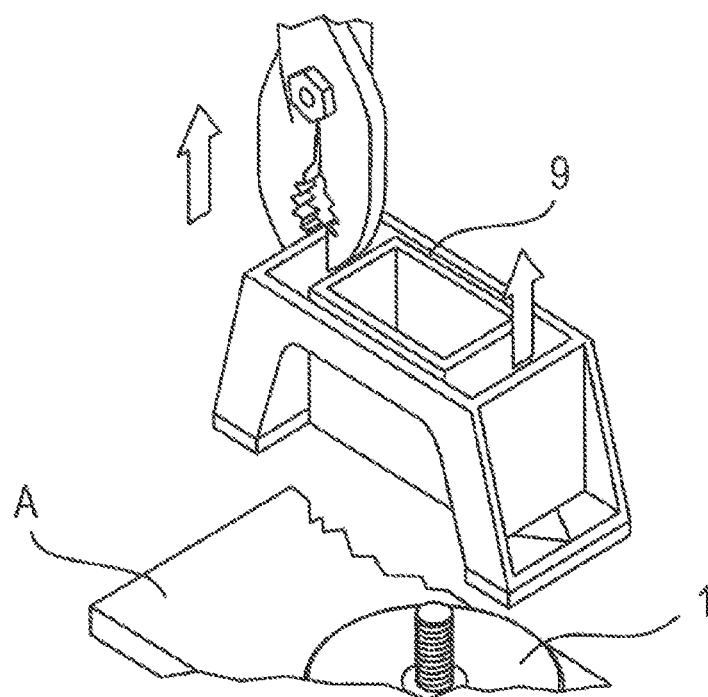

Therefore, in use, first of all an application of the adhesive onto the adhesive surface 3 of the connection element 1 as well as a removing of the protective layer from the adhesive taps 5 at the feet 7 of the adhesive bridge 9 takes place, as is shown in FIG. 1. After that, a positioning in place of the adhesive bridge 9 with the adhesive taps 5 on the component surface of the structural component A, which is intended to be adhered with the connection element 1, takes place. Subsequently, a pressing down of the connection element 1 in the adhesive bridge 9 takes place so that the adhesive surface 3 together with the adhesive is pressed onto the component surface of the structural part A. These steps are illustrated in FIG. 2. Subsequently, as is shown in FIG. 3, a removing of the adhesive bridge 9 takes place once the adhesive has reached its full strength.

A disadvantage of this approach is that in the course of the fastening of the connection element as a separate component, the adhesive bridge is necessary which must be removed in a separate step. Compared to that, it is advantageous that with this approach, any desired material combination for the connection element can be processed.

In order to avoid the use of the adhesive bridge and to reach a more efficient pre-fixing of the connection element on the component surface of a structural component, the use of a connection element out of a material that is transparent or can be penetrated with light in connection with an adhesive which cures by means of light is known.

A corresponding connection element and a method for its fastening onto a surface is for example described in DE 10 2006 012 411 A1. The connection element comprises a sleeve-shaped receiving part for receiving an element that can be fastened within the interior of the sleeve shaped receiving part as well as a flange-like extension with a depression that is configured such that the connection element can be fastened by filling the depression with a suitable fastening means on the surface.

A further corresponding connection element for adhering to a component surface is described in WO 2012/107240 A1. The connection element for adhering to a component surface comprises a holding bolt with a bolt portion to which a structural component is fastenable. An anchoring of the retaining or holding bolt is fastened in a plate out of a material which can be irradiated with light such, that due to the rotation-impeding and a pull-out impeding shape of the anchoring, a reliable connection between the holding bolt and the plate arises.

A material which can be penetrated with light is used with these connection elements. Only in this way, it is guaranteed that a sufficient pre-fixing of the connection element by means of the irradiation with light takes place.

In addition, connection elements are known which consist of a material that can be irradiated with light and comprise an opening in the base element for adding adhesive. In the same way, connection elements out of a material which can be penetrated with light are known which comprise an overflow opening for adhesive in the base element.

A special application area with high dynamic load, compared with other application areas, in particular vibrations, is aeronautics. Here there are, besides the requirements to the connection to be established, special requirements to the component material to be used due to the arising dynamic loads. The materials for connection elements which are used in this technical area can normally not be penetrated with light. Therefore, the use of an adhesive which cures by means of light is not possible with the current state of the art.

It is therefore the object of at least some implementations the present invention to provide a connection element for adhering to a component surface of a first component which is particularly suitable for applications in aeronautics and which can be fastened more efficiently compared to the connection elements known so far in this technical area.

3. SUMMARY

The above object is solved by a connection element for adhering to a component surface, a connection element for adhering to a component surface, a first component with a connection element adhered to it, an arrangement consisting of a first and a second component which are connected by means of a connection element, a manufacturing method of a connection element as well as a method for fastening a first component to a second component by means of a connection element. Further embodiments and further developments arise from the subsequent description, the drawings as well as the appending claims.

In a first alternative of a connection element for adhering to a component surface of a first component, so that by means of the connection element, a second component is fastenable at the first component, the connection element comprises a base element comprising an adhesive side with an adhesive surface as well as an assembly structure for the connection with the second component, with the assembly structure being arranged on an side of the base element that is opposite to the adhesive side or lateral to it, and the base element consists of a thermoplastic plastic material with a temperature of continued use of at least 130° C., the plastic material being poorly penetrable with light or not penetrable with light, and the base element comprises at least one irradiation region so that the base element can be penetrated with light in the irradiation region such that light energy penetrates the base element, with the base element having a lower thickness in the irradiation region in the cross section and a transmission degree in the irradiation region is at least 20% at a wave length of the light between 320 and 500 nm.

Thus, the base element consists of a thermoplastic plastic material from the sector of high performance plastic materials which cannot be penetrated with light or poorly be penetrated with light. In particular in the sector of aeronautics, thermoplastic plastic materials from the sector of high performance plastic materials are more and more frequently used for technological as well as cost reasons. The term high performance plastic material or high performance thermoplastic is based on an application-related, engineering classification of thermoplastic plastic materials. Here, generally, a distinction is made between three areas, i.e. standard plastic materials, technical plastic materials and high performance plastic materials.

In this connection, high performance plastic materials fulfil higher demands than standard and technical plastic materials. In particular, they have better mechanical characteristics, a higher resistance to chemicals and/or a higher thermal resistance. Due to this higher thermal resistance, their processing may be, however, often complicated and frequently, special machines are necessary for this purpose. Furthermore, high performance plastic materials are often specialized to one specific characteristic, e.g. resistance to thermal forming. Thus, they stand in contrast with technical plastic materials which cover a broad range of functions.

All high performance plastic materials contain aromatic structures. Aromatic structures unite the two most important features for the resistance to high temperatures. On the one hand, they are resistant to oxidation as the aromatic carbon hydrogen bond is significantly more stable than the aliphatic carbon hydrogen bond, so that the formation of radicals which arises in the course of a thermal decomposition or fire is made difficult. On the other hand, the chain rigidity of aromatic polymers is higher than that of aliphatic polymers which increases the glass transmission temperature or, in case of crystalline polymers, the crystalline melting point, and decreases solubility.

As indicated above, the thermal stability may be a central characteristic of high performance plastic materials. Based on the characteristics of standard plastic materials, mechanical and thermal improvements can already be achieved by adding reinforcing materials such as glass and carbon fibers, the addition of stabilizers and by increasing the degree of polymerization. The temperature of continued use or permanent operating temperature of at least 130° C. which is present in the area of high performance plastic materials is achieved by replacing aliphatic units by aromatic units. In this context, the term temperature of continued use refers to the maximum temperature at which the respective plastic material has lost not more than 50% of its initial characteristic in hot air after 20,000 hours of storage. In addition, reference is made to DIN IEC 216 as well as DIN EN 60216 in this connection.

A higher temperature of continued use can be reached by a complete renunciation of aliphatic elements and a tight bond of aromats by functional groups such as ether, sulfone or imide groups, so that temperature of continued use of at least 200° C. to at least 260° C. can be reached. Therefore, in one embodiment, the thermoplastic plastic material has a temperature of continued use of at least 150° C., the temperature in some implementations may be at least 170° C. and in some implementations may be at at least 190° C.

In order to be able to process the connection element from this high performance plastic material in an efficient way, it is intended that in the base element, there is a irradiation region. In the irradiation region, the material of the base element is therefore also present, however, only with a lower thickness compared with the adjacent regions. In this connection, the thickness is chosen such that the transmission degree or transmittance of light with a wave length between 320 and 500 nm is at least 20%. The transmission degree may be at least 30%, or at least 40% or at least 50%.

The transmission degree T, a material characteristic, is defined as the quotient between the wave intensity I behind the obstacle and the intensity $I_0$ in front of the obstacle, i.e. here the irradiation region. Thus, the transmission degree is a dimension figure for "transmitted" intensity and accepts values between 0 and 1 or 100%, respectively. The transmission degree is, among others, dependent on the thickness in the irradiation region, on the wave length of the light and on the angle of incidence of the light. In the present case, the reaching of the transmission degree of at least 20% refers to a light beam which enters the irradiation region perpendicularly, with the light having a wave length in the range between 320 and 500 nm.

Due to this existing irradiation region, an adhesive which cures by means of light radiation can be used so that for example, a pre-fixing without using an adhesive bride or a similar device can be realized. This makes the use of the connection element more efficient and will be described in the following by means a corresponding fastening at a first component.

The first component may be a structural component, e.g. an aircraft wing or an aircraft fuselage. A second component is supposed to be arranged to that and/or held at a distance to that by means of the connection element. Therefore, the second component is an add-on part, e.g. a cladding or the like.

Firstly, an adhesive which cures by means of light beams is applied onto the adhesive side of the base element and/or the first component. Subsequently, the adhesive side of the connection element is arranged on the first component. After that, a radiation with light of the arrangement out of the first component and the connection element arranged on it takes place, so that the adhesive realizes at least a pre-fixing of the connection element in the irradiation region. Finally, and before fastening the second component to the connection element, a curing of the adhesive takes place.

An advantage of the first alternative of a connection element is therefore that the connection element consists of a high performance plastic material, at the same time, however, it is fastenable to the first component using an adhesive which cures by means of light. Compared with the state of the art, a separate element, such as an adhesive bridge, is not necessary. The choice of material is neither limited to a material which can be irradiated with light, in contrast to the state of the art. Thus, connection elements are accessible for a larger application area, which could not be realized before due to the requirements to the material being penetrable with light.

In a further embodiment of the connection element, a junction or transition to the irradiation region is configured steplessly, in particular continuously. In other words, the junction or transition from one region adjacent to the irradiation region to the irradiation region is thus designed in a smooth, i.e. stepless, way. Frequently, the used light sources do not shine onto the adhesive surface exclusively orthogonally, but always with radiation angles of up to 120° cone angles. Therefore, steps or 90° walls in the transition to the irradiation region would for example lead to an undesired formation of shadows in the edge region. This formation of shadows is at least reduced due to the stepless configuration.

In a further embodiment of the connection element, the thickness in the irradiation region is not more than 50% of the thickness of the base element adjacent to the irradiation region. The thickness in the irradiation region is not more than 40%, or 30% and in some implementations may be not more than 20% of the thickness of the base element adjacent to the irradiation region or a basic wall thickness of the base element. The reason for that is that the fastening can be carried out particularly efficiently when the thickness in the irradiation region may be thin and the transmission degree is increased in this way.

In a further embodiment, and particularly when the material of the connection element can only poorly be penetrated with light, it is advantageous when the transmission degree in the irradiation region is increased by at least 50% compared with the remaining base element. With this configuration, too, the fastening can take place in a particularly efficient way.

The irradiation region of the connection element is configured such that a depression is provided on the adhesive side and/or on the side of the base element that is opposite to the adhesive side. In case of a depression on the adhesive side of the base element, the opposite side of the irradiation region is flush with the adjacent region of the base element. In this way, adhesive can enter into the depression and a secure fastening of the connection element may be realized. In case of a depression on the side that lies opposite to the adhesive side, the irradiation region at the adhesive side is flush with the adjacent region of the base element. Thus, a smooth, plane adhesive surface be can generated. In a third alternative, a depression can be provided both from the adhesive side as well as from the opposite side of the base element. For example, the material in the irradiation region is arranged exactly in the middle with respect to the adjacent regions of the base element when viewed in the cross-section. Thus, a depression for the better anchoring of the adhesive is provided, too, with the side of the base element that lies opposite to the adhesive side comprising a depression, too. In this way, advantageous optical effects can be achieved which support a bundling or diffusion of the light beams.

In a second alternative of a connection element to be adhered to a component surface of a first component, so that a second component can be fastened to the first component by means of the connection element, the connection element comprises: a base element which comprises an adhesive side with an adhesive surface as well as an assembly structure for connecting with the second component, with the assembly structure being arranged on a side of the base element that is opposite to the adhesive side, or laterally to it, and the base element consists of a thermoplastic plastic material with a temperature of continued use of at least 130° C., which can poorly be penetrated with light or not be penetrated with light, and the base element comprises at least one irradiation region so that the base element can be penetrated with light in the irradiation region such that light energy penetrates the base element, with the irradiation region being formed by a break-through.

Thus, the second alternative of the connection element differs from the first alternative of the connection element in that there is a break-through in the irradiation region, instead of a smaller thickness of the material of the base element. With respect to the basic characteristics and the functionality, reference is therefore made to the above explanations regarding the first alternative of the connection element.

The use of break-throughs may be with materials which have no transparency at all in the necessary light spectrum, i.e. here in the range from 320 nm to 500 nm, neither in case of a low material thickness. Thus, an advantage of this alternative is that such materials in combination with an adhesive that cures by means of light can be used.

In a further embodiment of the second alternative of the connection element, the break-through is closed by means of a coating or a plug which consists of a material that can be penetrated with light. In this way, an exiting of adhesive via the break-through is prevented. Furthermore, a plane adhesive surface can be realized in this way, too. In this connection, it may be advantageous when the coating or the plug closes the break-through from the adhesive side of the base element. In this way, a continuous adhesive surface is created, as described above in connection with the first alternative of the connection element.

The subsequently described embodiments may relate to both the first as well as the second alternative of the connection element. This means that each of the subsequently described features can be realized with both alternatives.

In at least some implementations, the adhesive surface may include a plurality of projections. In this way, a separate structure for improving the fastening to a first component may be created, when no depressions are provided on the adhesive side.

In a further embodiment, the irradiation region has an elongated form, which may be arched. With this design, the irradiation regions are enlarged compared to punctual irradiation regions and more light can reach the adhesive during an irradiation with light. In this connection, the connection element additionally or alternatively may include a plurality of irradiation regions. In case of a plurality of irradiation regions, it the adhesive surface may be circular and at least two irradiation regions may be arranged on an imagined common circle around a center point of the adhesive surface. Due to this precisely defined arrangement, a fastening of the connection element can be controlled better.

In a further embodiment of the connection element, an engagement feature is provided at the base element so that the connection element can be processed in an automated way. An advantage of this embodiment is in particular that the connection element can be processed in a fully automated way, i.e. in particular, it can be fastened at the first component in a fully automated way.

According to a further embodiment of the connection element, the assembly structure comprises: a bolt with outer thread, the bolt being arranged particularly on a side of the base element opposite to the adhesive side, a bush with an inner thread, the bush being arranged particularly on a side of the base element that is opposite to the base element, or a nut or an opening, with inner thread, may be arranged laterally at the base element with respect to the adhesive side. Depending on the assembly structure that is used, different objects can thereby be realized with the connection element. For example, the connection element can be used for fastening a second component, in particular an add-on part such as a cladding, or as a distance holder.

A first component comprises a connection element according to one of the two above-described alternatives which is adhered to the component. As in this way, the first component comprises the connection element, reference is made to the above explanations with respect to the resulting advantages, in order to avoid repetitions.

An arrangement consists of a first and a second component, which are connected through a connection element according to one of the two above-described alternatives. With respect to the resulting advantages, reference is also made to the above explanations.

A manufacturing method of a connection element includes the steps: providing a mold, in particular an injection mold, which is configured complementary with respect to the connection element to be formed, filling the mold with a thermoplastic plastic material with a temperature of continued use of at least 130° C., the plastic material being poorly penetrable with light or not penetrable with light, and curing the plastic material as well as removing the connection element from the mold. Both alternatives of the connection element can be manufactured with the manufacturing method. Therefore, reference is made to the above descriptions in terms of the arising advantages.

In a further embodiment of the manufacturing method, with the irradiation region being formed by a break-through, the manufacturing method comprises the further step: arranging a coating or a plug at the break-through which consists of a material that can be penetrated with light. In this way, an exiting of adhesive via the break-through is prevented. Furthermore, a plane adhesive surface can be realized in this way.

A method for fastening a first component to a second component by means of a connection element comprises the steps: arranging an adhesive which is curable by means of light beams onto the adhesive side of the base element and/or at the first component, arranging the adhesive side of the connection element onto the first component, irradiating the arrangement consisting of the first component and the connection element arranged thereon with light, so that the adhesive realizes at least a pre-fixing of the connection element in the irradiation region, as well as curing the adhesive. The connection element can be fastened at the first component with the method. In this context, the radiation with light at least provides for a pre-fixing of the connection element before the curing. In particular in case of the use of an adhesive that can be activated by means of light, a chain reaction for curing the adhesive due to the radiation with light can be initiated. This will be explained in detail later on. With respect to the arising advantages, reference is made to the explanations regarding the connection element.

In a further embodiment of the method, the method comprises the further step: arranging a second component at the assembly portion once the adhesive has cured. In this way, a connection between the first and the second component is established by means of the connection element, as is already described above.

In at least some implementations, for the step of irradiation with light, light with a wave length from 320-500 nm may be used. The adhesive may be chosen from one of the groups comprising: radically curing adhesives, cationically curing adhesives, dually curing adhesives or a combination thereof. In case of radically curing adhesives, the photo initiators are cleaved into free radicals (homolytic cleavage) due to the influence of light radiation, in particular UV radiation, or they abstract hydrogen atoms from carbon hydrogens, thus generating radicals (Norrish reaction type II). These radicals initiate the formation of polymer chains. An example for such adhesives are UV acrylates. In contrast to radically curing adhesives, cationically curing adhesives can continue to cure in the dark, too, after a sufficient activation with light radiation. Dually curing adhesives, i.e. adhesive with more than one curing mechanism, may be suitable for applications in real shadow regions which are not accessible to any radiation source. The curing in the shadow region can then arise by means of a heat supply, for example.

4. BRIEF DESCRIPTION OF THE DRAWINGS

Figure 4:
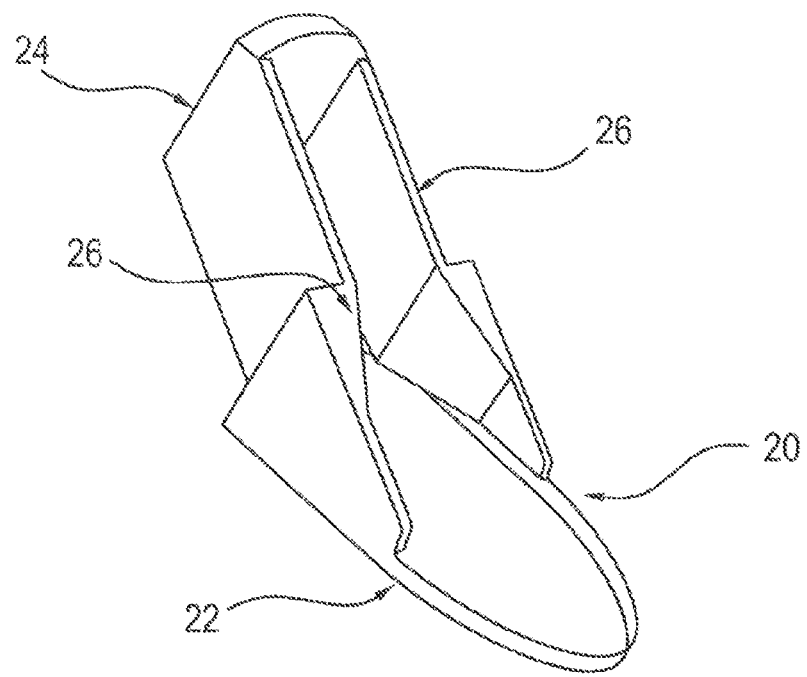
Figure 5:
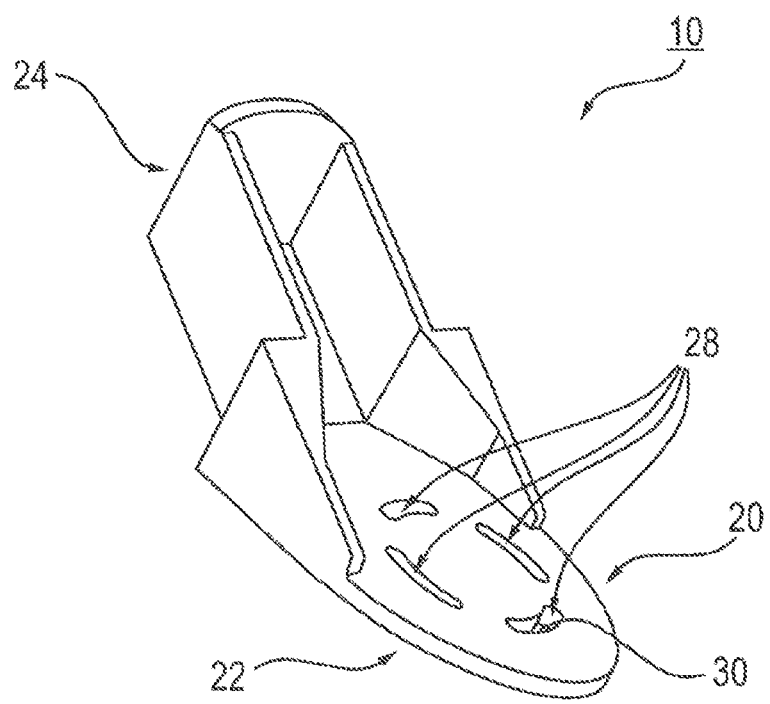
Figure 6:
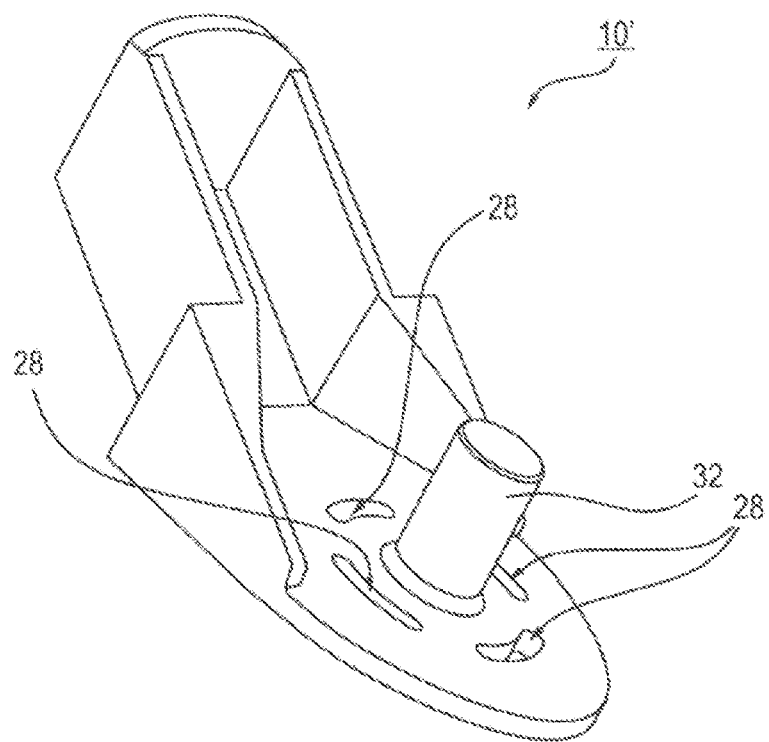
Figure 7:
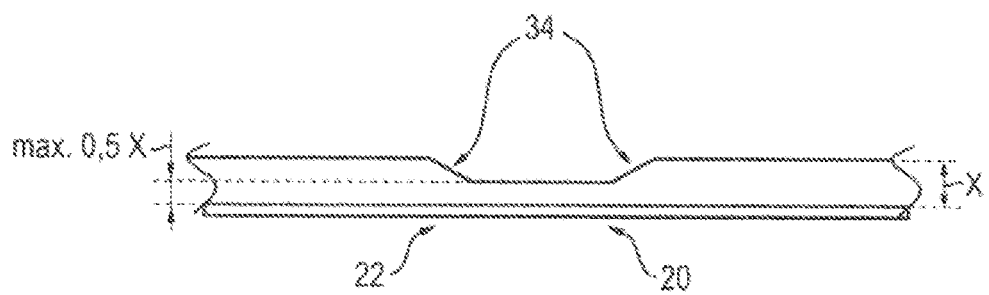

In the following, the present disclosure will be described in detail with reference to the drawings. In the drawings, the same reference signs denote the same components and/or elements. It shows:

FIG. 1 a first step of a fastening method according to the state of the art for a connection element, FIG. 2 a subsequent second step of the fastening method according to the state of the art for a connection element, FIG. 3 a third step of the fastening method according to the state of the art for a connection element, FIG. 4 a connection element for the clarification of the structure, FIG. 5 a first embodiment of a connection element, FIG. 6 a second embodiment of a connection element, FIG. 7 a cross section through a portion of an embodiment of a connection element with a lower thickness in the irradiation region, FIG. 8 a flow chart of an embodiment of a manufacturing method of a connection element, and FIG. 9 a flow chart of an embodiment of a fastening method of a connection element.

5. DETAILED DESCRIPTION

An embodiment of a connection element 10 will be described in the following, in particular with reference to FIG. 5. FIG. 4 explanatory shows the basic structure for the better comprehensibility.

In use, the connection element 10 is adhered to a component surface of a first component, in particular of a structural component as for example an aircraft wing or an aircraft fuselage. Therefore, a second component, which may be an add-on part as for example a cladding, can be fastened to the first component by means of the connection element 10.

The connection element 10 includes a base element 20. The base element 20 has an adhesive side with an adhesive surface 22 as well as an assembly structure 24 for the connection with the second component. In the depicted embodiments, the adhesive surface 22 is configured in form of a circle and the assembly structure 24 is arranged laterally to the adhesive side. Furthermore, the connection element 10 has a stiffening 26 which is arranged adjacent to the assembly structure 24. The assembly structure 24 can, for example, comprise a nut or opening, which may have inner thread.

It is also conceivable that the assembly structure is arranged on the side of the base element 20 that is opposite to the adhesive side. In this connection, the assembly structure can for example include a bolt with outer thread or a bush with inner thread. Depending on the used assembly structure, different objects can be realized with the connection element. For example, the connection element can be used for fastening a second component, which may be an add-on part such as a cladding, or as a distance holder.

The material of the base element 20 is a thermoplastic plastic material with a temperature of continued use or permanent operating temperature of at least 130° C., in particular a high performance plastic material, which may be intended for the use in the sector of aeronautics. Therefore, the material is poorly penetrable with light or not penetrable with light. This will be explained later.

The term high performance plastic material or high performance thermoplastic is based on an application-related, engineering classification of thermoplastic plastic materials, which distinguish between standard plastic materials, technical plastic materials and high performance plastic materials. As the name already suggests, high performance plastic materials fulfil higher demands than standard and technical plastic materials. In particular, they have better mechanical characteristics, a higher resistance to chemicals and/or a higher thermal stability. Therefore, they are in particular contrast to the technical plastic materials, which cover a broad spectrum of functions.

All high performance plastic materials contain aromatic structures. As the aromatic carbon hydrogen bond is significantly more stable than the aliphatic carbon hydrogen bond, the formation of radicals which arises in connection with a thermal decomposition or fire is made more difficult due to the resistance to oxidation. Furthermore, the chain rigidity of aromatic polymers is bigger than that of aliphatic polymers, which increases the glass transition temperature or, in case of crystalline polymers, increases the crystallite melting point and decreases solubility. Aromatic structures therefore unite the two most important features for the resistance against high temperatures. Therefore, the thermal stability is a central characteristic of high performance plastic materials.

Based on the characteristics of standard plastic materials, mechanical and thermal improvements can already be achieved by adding reinforcement materials such as glass and carbon fibers, by adding stabilizers and by increasing the degree of polymerization. The temperature of continued use of at least 130° C. that is present in the sector of high performance plastic materials is, however, only achieved by replacing aliphatic by aromatic units. In this connection, the term temperature of continued use denotes the maximum temperature at which the respective plastic material has lost not more than 50% of its initial characteristics in hot air after 20,000 hours of storage. In addition to that, reference is made to DIN IEC 216 as well as to DIN EN 60216.

A higher temperature of continued use can be reached by completely renunciating aliphatic elements and by a tight bonding of aromatic compounds by functional groups such as ether, sulfone or imide groups, so that temperatures of continued use of at least 200° C. to at least 260° C. can be reached. Therefore, in a further embodiment, the thermoplastic plastic material has a temperature of continued use of at least 150° C., may be at least 170° C. and in at least some implementations may be at least 190° C. Additionally, the thermoplastic plastic material may be chosen from the group of amorphous plastic materials. Amorphous in this connection is generally the designation for the state of a solid substance, in which the components, i.e. atoms, ions or molecules, are not periodically arranged over a larger portion, the so-called long-range order. The amorphous thermoplastic plastic materials are transparent in the initial form. In addition, a component out of an amorphous thermoplastic plastic material is hard compared with partly crystalline thermoplastic high performance plastic materials. A disadvantage compared with partly crystalline plastic materials is, however, that it has a lower chemical resistance.

In order to be able to process the connection element 10 from this high performance plastic material in combination with a light-curing adhesive, irradiation regions 28 are present in the base element 20. In the irradiation region 28, the material of the base element is therefore also present, however, only with a lower thickness compared with the thickness X of the adjacent regions. This will be explained in the following with reference to FIG. 7. In this connection, the thickness of the material in the irradiation region 28 is chosen such that the transmission degree of light with a wave length of between 320 and 500 nm is at least 20%. The transmission degree may be at least 30%, or at least 40% and in some implementations may be at least 50%.

The transmission degree T is a material characteristic and defines as the quotient between the wave intensity I behind the obstacle and the intensity $I_0$ in front of the obstacle, i.e. here the irradiation region 28. Thus, the transmission degree is a dimension figure for transmitted intensity and adapts values between 0 and 1 or 100%, respectively. The transmission degree depends on, among others, the thickness in the irradiation region 28, on the wave length of the light and on the angle of incidence of the light. In the present case, the reaching of the transmission degree of at least 20% relates to a light beam which enters perpendicularly into the irradiation region 28, with the light having a wave length in the range between 320 and 500 nm.

Due to the present irradiation regions 28, an adhesive which cures by means of light irradiation can be used so that for example, a prefixing without the use of an adhesive bridge or any similar device can be realized. This allows the efficient use of the connection element, something that also arises from the later-described fastening method.

Consequently, the connection element 10 therefore consists of a high performance plastic material, it can, however, at the same time be fastened at the first component by means of an adhesive which cures by means of light. A separate element, e.g. an adhesive bridge, is not necessary, compared with the state of the art. Furthermore, the choice of material is neither limited to a material which can be irradiated with light, in contrast to the state of the art. Thus, connection elements 10 in combination with a light-curing adhesive are accessible for a larger application area, which was not realizable due to the demands to the material being irradiatable with light.

In an alternative of the connection element that is not illustrated, break-throughs are provided instead of lower thicknesses in the irradiation region 28. The use of break-throughs may be preferred with materials which do not have any transparency in the necessary light spectrum, i.e. here in the range between 320 nm and 500 nm, neither in case of a lower material thickness. Thus, an advantage of this alternative is that such materials in combination with an adhesive that cures by means of light can be used, too. The break-through may be closed by means of a coating or a plug, which consists of a material that can be penetrated with light. In this way, an exiting of adhesive via the break-through is prevented. In addition, a plane adhesive surface can be realized in this way. In this connection, it is particularly advantageous when the coating or the plug closes the break-through from the adhesive side of the base element. In this way, a continuous adhesive surface is created, as explained above in connection with the first alternative of the connection element.

With respect to FIG. 7, the configuration of the irradiation region 28 is now described in detail. A transition 34 to the irradiation region 28 is configured steplessly, here. In other words, the transition 34 from a region adjacent to the irradiation region 28 to the irradiation region 28 is configured smoothly. The reason for that is that the used light sources often do not exclusively irradiate the light orthogonally onto the adhesive surface but often irradiate the light with radiation angles of up to 120° cone angles. Therefore, steps or 90° walls in the transition 34 to the irradiation region 28 would therefore for example lead to an undesired formation of shadows in the edge region. This formation of shadows is at least reduced due to the stepless design.

Furthermore, the thickness in the irradiation region 28 is not more than 50% of the thickness X of the base element 20 adjacent to the irradiation region 28. It may also be preferred that the thickness in the irradiation region is not more than 40%, or 30% and in some implementations, not more than 20% of the thickness X of the base element 20 adjacent to the irradiation region 28 or a basic wall thickness of the base element 20. The reason for that is that the fastening can be effected in a particularly efficient way when the thickness in the irradiation region 28 is particularly thin and the transmission degree is increased in this way. This is also supported by the fact that when the material of the connection element 10 is poorly penetrable, the transmission degree in the irradiation region 28 is increased by at least 50% compared with the remaining base element 20.

In the illustrated embodiment, the irradiation region 28 of the connection element 10 is configured such that a depression 30 is provided on the side of the base element 20 that lies opposite to the adhesive side. Thus, a continuous, plane adhesive surface can be generated in this way, which is particularly advantageous.

In an alternative embodiment, the depression is provided on the adhesive side of the base element, so that the opposite side of the irradiation region is flush with the adjacent region of the base element. In this way, adhesive can enter into the depression and a secure fastening of the connection element may be realized. In a third embodiment, a depression on both the adhesive side and on the opposite side of the base element can be provided. For example, the material in the irradiation region is arranged precisely in the center with respect to the adjacent regions of the base element, when observed in cross section. Thus, a depression for the better anchoring of the adhesive is provided, with the side of the base element that lies opposite to the adhesive side comprising a recess, too. Advantageous optical effects can be generated by that, which support a bundling or diffusion of the light beams.

The irradiation region 28 has an elongated shape that is arched. With this design, the irradiation regions 28 are increased compared with punctual irradiation regions and more light can reach the adhesive during an irradiation with light. Furthermore, a plurality of irradiation regions 28 is present, four in the illustrated embodiment. In this connection, in the illustrated embodiment, all four irradiation regions 28 are arranged on an imagined common circle around a center point of the adhesive surface. Due to this precisely defined arrangement, a fastening of the connection element can be controlled better.

In another embodiment, as is illustrated in FIG. 6, the connection element 10' additionally has an engagement feature 32 at the base element 20, so that the connection element 10' is processed in an automated way. An advantage of this embodiment is that the connection element 10' may be processed completely automated due to the engagement feature 32, i.e. in particular, it can be fastened in a fully automated way at the first component.

Now, with respect to FIG. 8, an embodiment of a manufacturing method for a connection element 10; 10' is described. First of all, a providing of a mold takes place in step A, in particular of an injection mold, which is configured complementary with respect to the connection element 10; 10' to be formed. After that, a filling of the mold with a thermoplastic plastic material having a temperature of continued use of at least 130° C. takes place in step B, with the plastic material being poorly or not at all penetrable with light. Finally, in step C, a curing of the plastic material as well as a removing of the connection element 10; 10' from the mold takes place.

In case the irradiation region has a break-through, it is furthermore provided that in step D, a coating or plug is arranged at the break-through, which consists of a material that can be irradiated with light. This is either a separate, subsequent step, alternatively, this step can also take place after the curing of the plastic material of the base element and before the removing. In this way, an exiting of adhesive via the break-through is prevented. Furthermore, a plane adhesive surface can be realized in this way.

In FIG. 9, an embodiment of a method for fastening a first component to a second component by means of the connection element 10; 10' is shown. In step i, firstly, an arranging of an adhesive which cures by means of light beams on the adhesive side of the base element 20 and/or the first component first of all takes place. Subsequently, in step ii, an arranging of the adhesive side of the connection element 10; 10' on the first component takes place.

Then, in step iii, an irradiating of the arrangement consisting of the first component and the connection element 10; 10' that is arranged thereon takes place, so that the adhesive realizes at least a pre-fixing of the connection element 10; 10' in the irradiation region 28. In this context, the irradiating with light provides at least for a pre-fixing of the connection element 10; 10' before the curing. In particular when using an adhesive that can be activated by means of light, a chain reaction for curing the adhesive can also be initiated due to the radiation with light.

For the step of the irradiating with light, light with a wave length of 320-500 nm is used. The adhesive is chosen from one of the groups comprising: radically curing adhesives, cationically curing adhesives, dually curing adhesives or a combination thereof. In case of radically curing adhesives, the photograph initiators are cleaved into free radicals due to the impact of light radiation, in particular UV radiation (homolytic cleavage), or they abstract hydrogen atoms from carbon hydrogens, thus generating radicals (Norrish reaction type II). These radicals initiate the formation of polymer chains. An example for such adhesives are UV acrylates. In contrast to the radically curing adhesives, cationically curing adhesives can continue to cure in the dark, too, after a sufficient activation with light radiation. Dually curing adhesives, i.e. adhesives with more than one curing mechanism, are particularly suitable for applications in real shadow regions which are not accessibly to any source of radiation. The curing in the shadow region can then for example arise by means of a heat supply.

The connection element may be fastened with a two-component adhesive.

Finally, a curing of the adhesive takes place in step iv. In step v, a second component is then arranged at the assembly portion after the curing of the adhesive. In this way, a connection between the first and the second component is established via the connection element 10; 10'.

The invention claimed is:

1. A connection element for adhering to a component surface of a first component, so that by means of the connection element, a second component is fastenable at the first component, with the connection element comprising:
   a. a base element having an adhesive side with an adhesive surface as well as an assembly structure for connecting with the second component, wherein b. the base element consists of a thermoplastic plastic material with a temperature of continued use of at least 130° C. which is not penetrable with light, and c. the base element comprises at least one irradiation region so that the base element is irradiatable with light in the irradiation region such that light energy penetrates the base element, wherein d. the assembly structure is arranged on a side of the base element that is opposite to the adhesive side or the assembly structure is arranged on a side of the base element that is arranged laterally to the adhesive side, and e. the irradiation region is formed by a break-through and with the break-through being closed by means of a coating which consists of a material that is irradiatable with light and with the coating closing the break-through from the adhesive side of the base element.

2. The connection element according to claim 1, with the adhesive surface comprising a plurality of projections.

3. The connection element according claim 1, with the irradiation region having an elongated form, which is arched.

4. The connection element according to claim 1, which includes a plurality of irradiation regions.

5. The connection element according to claim 4, with the adhesive surface being arranged in form of a circle and at least two irradiation regions are arranged on an imagined common circle about a center point of the adhesive surface.

6. The connection element according to claim 1, with an engagement feature being provided at the base element, so that the connection element is processible in an automated way.

7. The connection element according to claim 1, with the assembly structure comprising:
   a. a bolt with outer thread,
   b. a bush with inner thread, or
   c. a nut or opening, that is arranged at the base element laterally with respect to the adhesive side.

8. A first component with a connection element according to claim 1 adhered thereon.

9. An arrangement including a first and a second component which are connected to each other via a connection element according to claim 1.

\* \* \* \* \*